(12) United States Patent
Thomson et al.

US010750443B2

(10) Patent No.: US 10,750,443 B2
(45) Date of Patent: Aug. 18, 2020

(54) AUTOMATING RADIO ENABLEMENT TO FACILITATE POWER SAVING

(71) Applicant: Cisco Technology, Inc., San Jose, CA (US)

(72) Inventors: Allan Thomson, Pleasanton, CA (US); Esteban Torres, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 281 days.

(21) Appl. No.: 15/494,200

(22) Filed: Apr. 21, 2017

(65) Prior Publication Data

US 2017/0223630 A1 Aug. 3, 2017

Related U.S. Application Data

(60) Division of application No. 14/289,779, filed on May 29, 2014, now Pat. No. 9,820,226, which is a continuation of application No. 12/823,546, filed on Jun. 25, 2010, now Pat. No. 8,811,247.

(51) Int. Cl.
*H04W 52/02* (2009.01)
*H04B 1/00* (2006.01)
*H04L 12/12* (2006.01)

(52) U.S. Cl.
CPC ........ *H04W 52/0216* (2013.01); *H04B 1/005* (2013.01); *H04L 12/12* (2013.01); *H04W 52/0235* (2013.01); *Y02D 70/00* (2018.01); *Y02D 70/142* (2018.01); *Y02D 70/40* (2018.01)

(58) Field of Classification Search
CPC .......... H04W 52/0216; H04W 52/0235; H04L 12/12; H04B 1/005; Y02D 70/142; Y02D 70/40; Y02D 70/00
See application file for complete search history.

(56) References Cited

U.S. PATENT DOCUMENTS

| 636,267 A | 11/1899 | Lindskog et al. |
| 6,104,937 A | 8/2000 | Fujimoto |
| 6,717,926 B1 * | 4/2004 | Deboille ............... H04W 48/12 370/328 |

(Continued)

FOREIGN PATENT DOCUMENTS

WO 2008044885 A2 4/2008

OTHER PUBLICATIONS

Extended Search Report dated Nov. 26, 2012 for related European Patent Application No. 11169642.3 filed Jun. 10, 2011.

*Primary Examiner* — Walter J Divito
(74) *Attorney, Agent, or Firm* — Patterson + Sheridan, LLP

(57) ABSTRACT

In an example embodiment, there is disclosed herein an apparatus comprising a wireless transceiver and a controller coupled to the wireless transceiver and configured to receive data via the wireless transceiver. The controller operates the wireless transceiver at a first power save state where the wireless transceiver can receive a frame but other circuits are de-energized. The controller is responsive to the wireless transceiver receiving a frame while the wireless transceiver is in a first power state to determine whether the frame is a predefined wakeup frame. The controller provides additional power to the wireless transceiver responsive to determining the frame is a predefined wakeup frame.

20 Claims, 4 Drawing Sheets

(56) References Cited

U.S. PATENT DOCUMENTS

| | | | | |
|---|---|---|---|---|
| 8,054,798 B2* | 11/2011 | Jeong | ................ | H04W 48/14 |
| | | | | 370/331 |
| 8,072,980 B1* | 12/2011 | Zhang | ................ | H04W 40/00 |
| | | | | 370/392 |
| 8,363,460 B2 | 1/2013 | Abedifard et al. | | |
| 2003/0012163 A1 | 1/2003 | Cafarelli et al. | | |
| 2003/0026240 A1 | 2/2003 | Eyuboglu et al. | | |
| 2003/0097398 A1 | 5/2003 | Knox et al. | | |
| 2005/0053047 A1 | 3/2005 | Osterloh et al. | | |
| 2006/0244588 A1* | 11/2006 | Hannah | ................ | A47F 10/04 |
| | | | | 340/539.13 |
| 2006/0276161 A1 | 12/2006 | Twitchell | | |
| 2008/0044014 A1* | 2/2008 | Corndorf | ................ | H04L 63/12 |
| | | | | 380/37 |
| 2009/0129306 A1 | 5/2009 | Twitchell, Jr. et al. | | |
| 2009/0310618 A1 | 12/2009 | Carter | | |
| 2009/0323573 A1 | 12/2009 | He et al. | | |
| 2010/0329363 A1 | 12/2010 | Ng et al. | | |
| 2011/0222587 A1 | 9/2011 | Chen | | |
| 2011/0249659 A1 | 10/2011 | Fontaine et al. | | |
| 2012/0057506 A1 | 3/2012 | Kumar | | |

\* cited by examiner

US 10,750,443 B2

AUTOMATING RADIO ENABLEMENT TO FACILITATE POWER SAVING

CROSS-REFERENCE TO RELATED APPLICATIONS

This application is a divisional of the co-pending U.S. patent application Ser. No. 14/289,779, filed May 29, 2014 and entitled "AUTOMATING RADIO ENABLEMENT TO FACILITATE POWER SAVING", which is a continuation of U.S. patent application Ser. No. 12/823,546, filed Jun. 25, 2010 and entitled "AUTOMATING RADIO ENABLEMENT TO FACILITATE POWER SAVING". Each of these applications is incorporated herein by reference in its entirety.

TECHNICAL FIELD

The present disclosure relates generally to power savings that may be employed by multi-transceiver wireless devices.

BACKGROUND

Dual mode (or multi-mode) devices, for example cellular phones with Wi-Fi compatible transceivers, have multiple wireless transceivers employing different technologies, all of which consume power. For example, a dual mode service provider may want to offload certain services from a cellular/3G network to a Wi-Fi network, so both radios should be active whenever the device is within range of a suitable Wi-Fi network. Many users, however, switch the Wi-Fi radio off because the power consumption of a device when multiple or all radios are powered on can be significant. A user may then manually switch on the Wi-Fi radio; however, the user may not always be aware of when Wi-Fi is available so this may reduce the use of Wi-Fi in dual mode devices in areas where Wi-Fi is available.

BRIEF DESCRIPTION OF THE DRAWINGS

The accompanying drawings incorporated herein and forming a part of the specification illustrate the examples embodiments.

OVERVIEW OF EXAMPLE EMBODIMENTS

Figure 1:
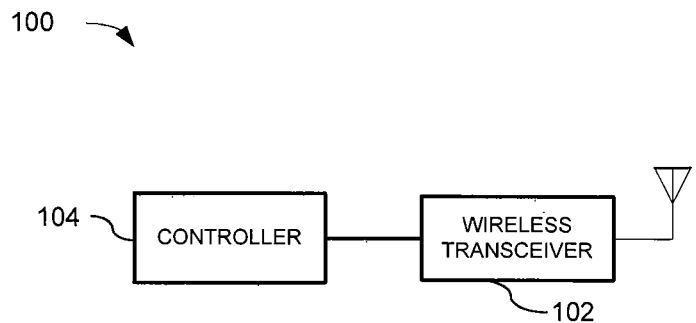
FIG. 1 is a block diagram of an apparatus on which an example embodiment can be implemented.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a wireless transceiver and a controller coupled to the wireless transceiver and configured to receive data via the wireless transceiver. The controller operates the wireless transceiver in a first power state where the wireless transceiver can receive a frame but cannot send a frame. The controller is responsive to the wireless transceiver receiving a frame while the wireless transceiver is in the first power state to determine whether the frame is a predefined wakeup frame. The controller provides additional power to the wireless transceiver responsive to determining the frame is a predefined wakeup frame.

In accordance with an example embodiment, there is disclosed herein a method, comprising operating a first wireless transceiver and periodically switching a second wireless transceiver between the first power state and a second power state, where the wireless transceiver cannot send and receive while operating the first wireless transceiver. A frame is received via the second wireless transceiver while in the first power state. The method further comprises determining whether the frame is a predefined wakeup frame from a network affiliated with a network in communication with the first wireless transceiver, and providing power to at least one additional circuit associated with the second wireless transceiver responsive to determining the frame is a predefined wakeup frame.

In accordance with an example embodiment, there is disclosed herein an apparatus comprising a wireless transceiver and a controller coupled to the wireless transceiver. The controller periodically generates a predefined wakeup frame to be transmitted by the wireless transceiver. The predefined wakeup frame is transmitted at a higher data rate than the lowest, default data rate (e.g. at a beacon frame rate).

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In an example embodiment, a dual mode device comprises a first radio, such as a cellular radio, and a second radio, such as a Wi-Fi radio. The Wi-Fi hardware can be powered down into a state where a minimal frame can be received by the hardware without requiring the rest of the Wi-Fi hardware such as encryption engine, as well as other associated hardware such as a host central processing unit (CPU) and transmit capabilities to be powered up. In this powered down state, the device can achieve improved power savings.

In an example embodiment described herein, a client is configured to recognize a predefined wakeup frame. Whenever the Wi-Fi hardware recognizes the frame it can wake up the rest of its Wi-Fi hardware that is powered down to save power. The Wi-Fi hardware can be configured to receive an unprotected action frame that has a header that does not require decryption decoding, etc., while most of the radio hardware (e.g., encryption engine and transmitter) remains asleep.

In an example embodiment, the Wi-Fi receiver will periodically wake up on a configurable interval looking for a frame with the specific wake up multicast address. Access Points (APs) will transmit an Unprotected Wireless Network Management (WNM) Action frame, referred to herein as a "wakeup frame" to the configured multicast address on a configured channel or a set of channels. In particular embodiments, the wakeup frame is sent on a channel that this is not necessarily the same channel as the AP's Basic Service Set Identifier (BSSID) operates on. In an example embodiment, a network with a "wake up channel" that is the same across a service provider's configuration domain. Clients (such as a multi-mode mobile device's Wi-Fi radio) that receive a validated wakeup frame will power up their hardware and begin normal operation of the radio. In particular embodiments, a validated wake up frame may include a digital signature of the BSSID that the client can validate once it wakes up its encryption hardware, so that the client only wakes up for certain networks. In an example embodiment, the wake up frame also includes at least one Neighbor Report element to indicate the correct regulatory class and channel for associating with an AP. For multiple AP environments, a list of neighbor APs could be provided.

In an example embodiment, if the Wi-Fi radio fails to associate with an AP within a configurable period or no longer detects the wakeup frame during the same period, the Wi-Fi radio will revert to the sleep state. In an example embodiment, APs may transmit the Wake Up Frame at a higher data rate than the beacon data rate (normally lowest data rate) so that the frame can be received quicker which may also help power savings. At least one example embodiment described herein provides for secure validation of the wakeup frame by including a digital signature in the frame for validation by the client that the wakeup frame came from an approved source.

FIG. 1 is a block diagram of an apparatus 100 on which an example embodiment can be implemented. Apparatus 100 comprises a wireless transceiver 102 and a controller 104 coupled to wireless transceiver 102. In an example embodiment, controller 104 comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, controller 104 operates the wireless transceiver 102 at a first power state where the wireless transceiver can receive a frame, but other circuits within wireless transceiver 102, such as the transmitter, encryption/decryption hardware, and other associated hardware such as a host processor are de-energized. Controller 104 determines whether a frame received by wireless transceiver 102 while in the first power state is a predefined wakeup frame. If the frame received by wireless transceiver 102 was a predefined wakeup frame, controller 104 switches wireless transceiver 102 to a different state, for example, switches on power to additional circuits associated with wireless transceiver 102.

Figure 4:
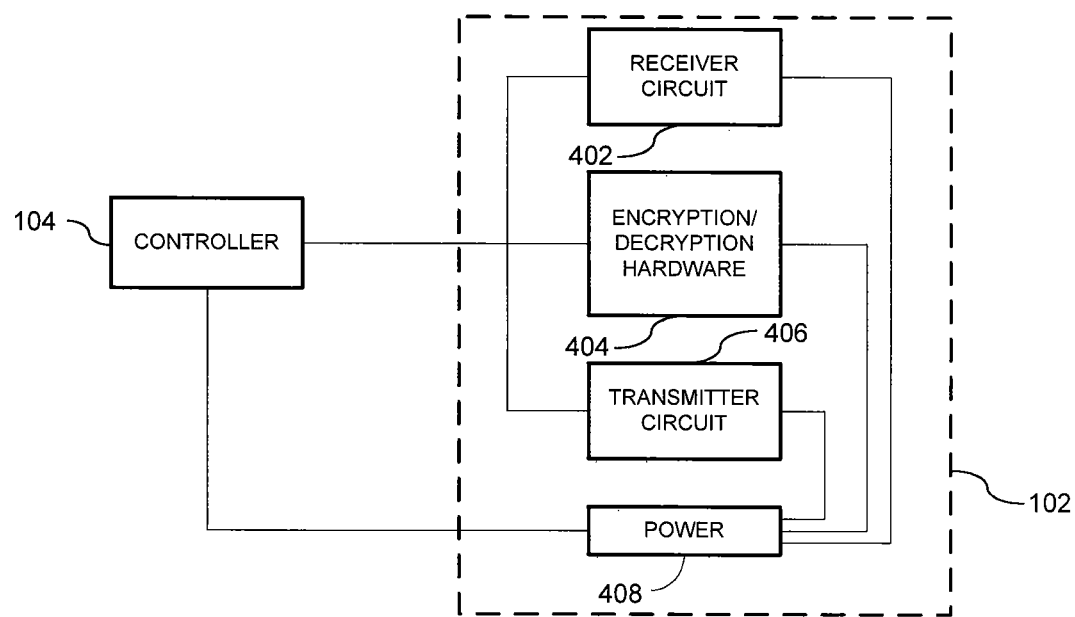
FIG. 4 is an example of an apparatus with a wireless transceiver comprising several modules upon which an example embodiment may be implemented.

For example, referring to FIG. 4 with continued reference to FIG. 1, wireless transceiver comprises a receiver circuit 402, encryption/decryption hardware 404 (in particular embodiments the encryption hardware and decryption hardware (circuits) may be separate circuits), a transmitter circuit 406, and a power source 408. In an example embodiment, controller 104 controls the operation of power source 408 and directs which circuits should receive power. For example, if the address (such as the destination address) of a wakeup frame received by receiver circuit 402 is to a predefined multicast address, controller 104 can instruct power supply 408 to provide power to encryption/decryption hardware 404. Encryption/decryption hardware 404 can then ascertain whether the frame has a valid signature. If encryption/decryption hardware 404 determines that the frame has a valid signature, controller 104 instructs power supply 408 to provide power to transmitter circuit 406 and attempt to associate with a predetermined network. In an alternate example embodiment, where the wakeup frame does not have a signature, controller 104 may instruct power supply 408 to selectively provide power to encryption/decryption hardware 404 and/or transmitter circuit 406.

In an example embodiment, wireless transceiver 102 is configured to operate on a plurality of wireless channels. While in the second power save state, wireless transceiver 102 operates on a selected one of the plurality of wireless channels to listen for the predefined wakeup frame. For example, AP's can be configured to periodically send a wakeup frame on a channel other than their operating channel. Wireless transceiver 102 can be configured to listen for the wakeup frame on selected channel. The wakeup frame may also contain data representative of BSSID for the AP sending the wakeup frame, regulatory class and actual operating channel, and/or a neighbor AP report listing the regulatory class, BSSID, and actual operating channels of one or more neighboring APs. Controller 104 switches wireless transceiver 104 to an operating channel specified in the wakeup frame to attempt to connect to the network.

Figure 2:
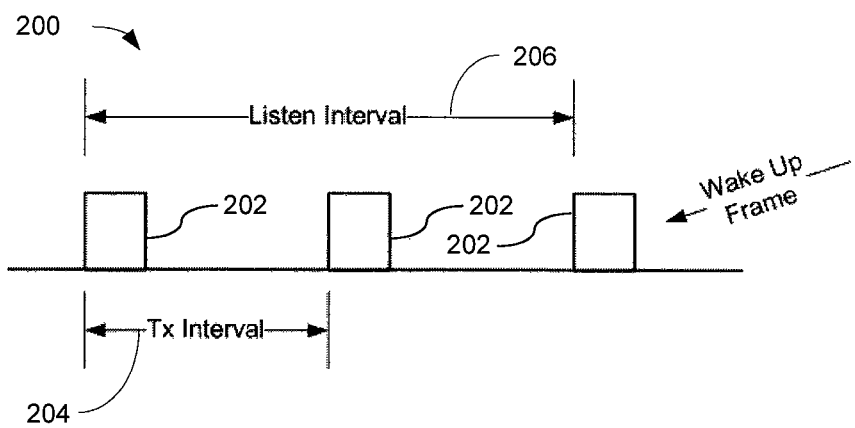
FIG. 2 is an example of a signal diagram illustrating the relationship between the listening interval of a wireless device and transmit interval of wakeup packets.

In an example embodiment, controller 104 switches wireless transceiver 102 between the first power state and a second power state where even less power is applied to wireless transceiver 102. For example, controller 104 may switch wireless transceiver 102 to the first power state for a predefined interval. Referring to FIG. 2 with continued reference to FIG. 1, APs may be configured to send a wakeup frame 202 at a predefined (Tx) interval 204 that is less than the listen interval 206 plus the transmission time for wakeup frame 202. For example, as illustrated in FIG. 2, an AP could transmit wakeup frame 202 at ½ the listen interval 206. In particular embodiments, to improve power savings, wireless transceiver 102 can sleep for a multiple of the listen interval and wakeup for the listen interval every n-times, where n is an integer greater than one. For example, if listen interval 206 is 2 seconds, Tx interval 204 is 1 second, wireless transceiver could wake every 8 seconds (four times the listen interval) and listen for 2 seconds.

In an example embodiment, controller 104 switches on a transmitter (e.g., transmitter 406 in FIG. 4) associated with the wireless transceiver 102 responsive to determining the predefined wakeup frame was received. Controller 104 attempts to associate with a network via the wireless transceiver. If controller 104 does not successfully associate with a network within a specified time period, controller 104 switches wireless transceiver to one of the first power state or the second power state.

Figure 3:
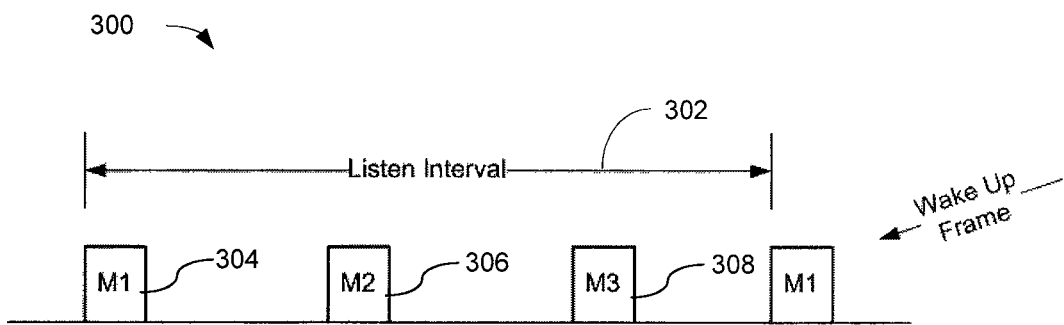
FIG. 3 is an example of a signal diagram illustrating an example where a sequence of packets is employed for advertising availability of a network.

In an example embodiment, controller 104 provides additional power to wireless transceiver 102 responsive to determining a predefined sequence of wakeup frames was received. A concern about employing an unencrypted public action frame to wake up a wireless device, such as wireless device 100 is that it can be duped into waking up by any other device transmitting the correct frame content. Although this causes no security harm to the wireless device, it reduces power savings. Thus, a sequence of frames may alleviate this problem. For example, referring to FIG. 3 with continued reference to FIG. 1, controller 104 may have wireless transceiver 102 listen for wakeup frames during a listen interval 302. If during listen interval a sequence of frames 304, 306, 308 is received, In an example embodiment, each frame 304, 306, 308 in the sequence of frames has a different multicast address. In particular embodiments, the sequence and multicast addresses can be configured dynamically so that if necessary, over time, a service provider could reconfigure the addresses and sequence of addresses to reduce the abuse of this feature.

In an example embodiment, wireless transceiver 102 may be employed in a multi-mode device. For example, referring to FIG. 5 with continued reference to FIG. 1, there is illustrated an apparatus 500 that further comprises a second wireless transceiver 502. Apparatus 500 can be configured so that wireless transceiver 502 operates while wireless transceiver 102 is in a power save mode. For example, if apparatus 500 is a mobile telephone with wireless transceiver 502 configured to operate on a cellular network and wireless transceiver 102 configured to operate on a lower power network such as Wi-Fi, while apparatus 500 is outside of Wi-Fi coverage, wireless transceiver 502 is employed for communications while wireless transceiver 102 is in a power save state. Controller 104 can switch wireless transceiver 102 from a (first) power save state where wireless transceiver 102 can not receive signals to a (second) power save state where wireless transceiver 102 can receive a minimal signal as described in example embodiments herein to determine whether apparatus 500 has moved within range of a Wi-Fi network supported (or affiliated) by a provider. If controller 104 determines that apparatus 500 is within range of a Wi-Fi network it can wakeup wireless transceiver 102 and communicate with the Wi-Fi network. Wireless transceiver 502 may be switched off or some communications may be routed through the Wi-Fi network instead of the cellular network while communicating via wireless transceiver 102.

In an example embodiment, an apparatus configured similar to apparatus 100 in FIG. 1 can be employed to implement an access point (AP). Controller 104 periodically generates a predefined wakeup frame to be transmitted by the wireless transceiver 102. In particular embodiments, the predefined wakeup frame is transmitted at a higher data rate than the lowest, default data rate, which can be the beacon frame rate. In an example embodiment, controller 104 puts a predefined multicast address into the predefined wakeup frame. The multicast address may put into the destination address of the frame. In particular embodiments, controller generates a sequence of wakeup frames. The sequence may have different multicast addresses and are sent in a predefined order. In an example embodiment, controller 104 puts a predefined signature into the predefined wakeup frame.

Figure 5:
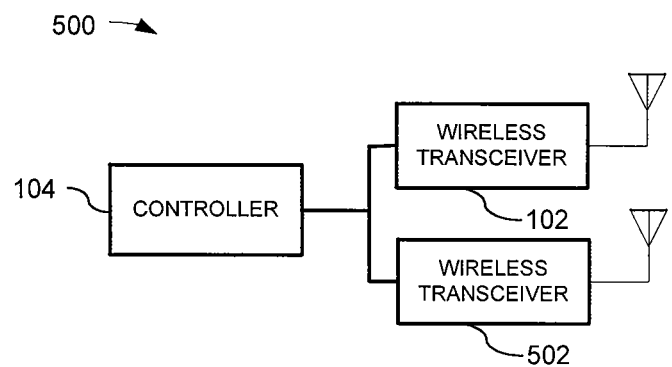
FIG. 5 is an example of a multi-mode device upon which can example embodiment can be implemented.
Figure 6:
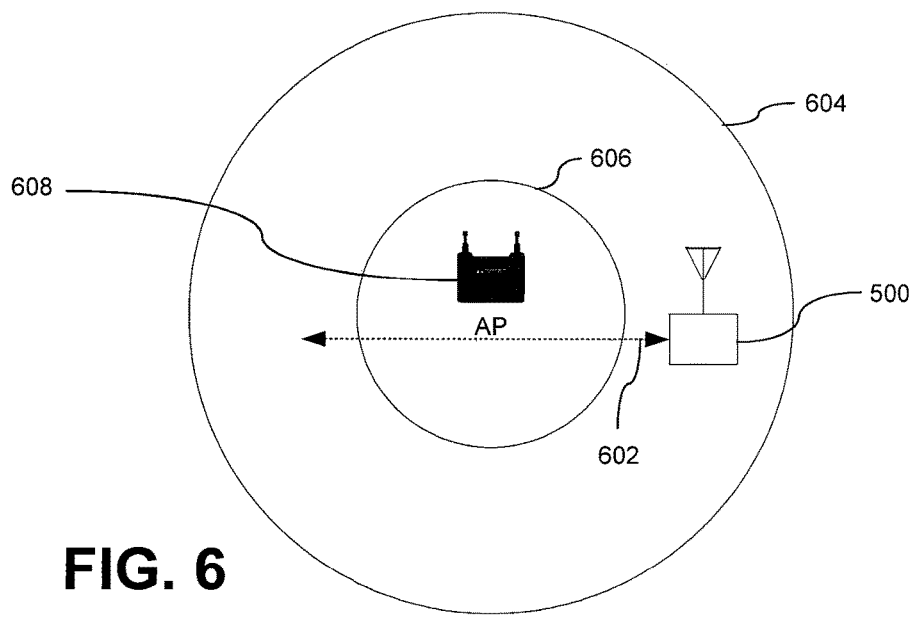
FIG. 6 illustrates an example of the operation of a multi-mode device in areas covered by various networks.

Referring to FIG. 6 with continued reference to FIG. 5, there is illustrated an example of apparatus 500 operating in an area with multiple networks. Apparatus 500 travels along path 602 in this example which is a straight line but those skilled in the art can readily appreciate a straight line was selected for ease of illustration as there are an infinite number of paths apparatus 500 may take. Coverage area 604 belongs to a higher powered protocol, for example a cellular network, whereas coverage area 606 belongs to a lower powered protocol such as Wi-Fi. AP 608 provides Wi-Fi access and as described in an example embodiment herein periodically sends a predefined wakeup frame. While apparatus 500 is operating outside of coverage area 606, wireless transceiver is periodically switched to the first power state to listen for wakeup packets. In particular embodiments, if wireless transceiver 102 does not receive a wakeup packet within a predefined interval, wireless transceiver 102 is switched to the second power state. While in coverage area 606 however, wireless transceiver 102 receives a wakeup frame and controller 104 switches wireless transceiver 102 (and if appropriate any other circuits associated with wireless transceiver 102 such as a host processor that were de-energized) on and wireless transceiver communicates with AP 608 while within coverage area 608. If apparatus 500 leaves coverage area 606, wireless transceiver 102 loses communications with AP 608 and controller 104 switches wireless transceiver 104 to one of the first or second power states, or periodically switches wireless transceiver 102 between the first and second power states.

Figure 7:
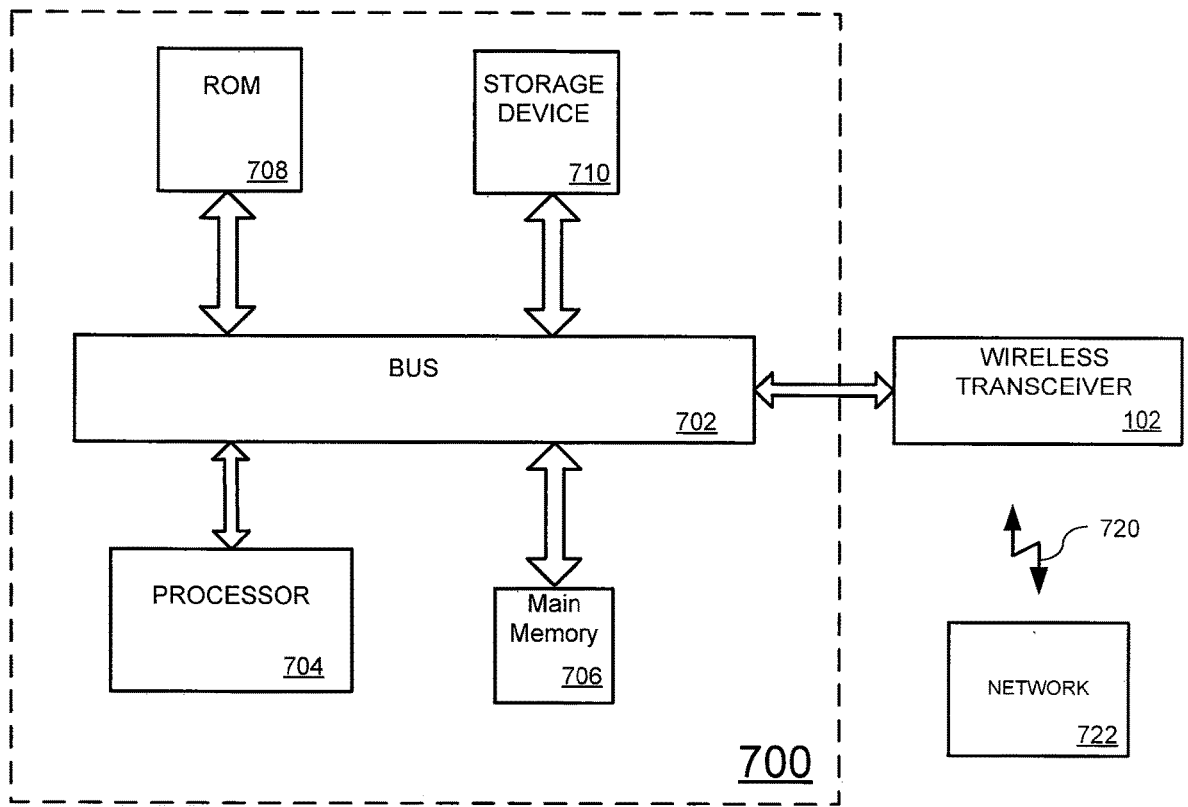
FIG. 7 is an example of a computer system upon which an example embodiment can be implemented.

FIG. 7 is an example of a computer system 700 upon which an example embodiment can be implemented. Computer system 600 may be employed to provide the functionality of controller 104 (FIG. 1, FIG. 4, and FIG. 5).

Computer system 700 includes a bus 702 or other communication mechanism for communicating information and a processor 704 coupled with bus 702 for processing information. Computer system 700 also includes a main memory 706, such as random access memory (RAM) or other dynamic storage device coupled to bus 702 for storing information and instructions to be executed by processor 704. Main memory 706 also may be used for storing a temporary variable or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

An aspect of the example embodiment is related to the use of computer system 700 for implementing power savings as described herein. According to an example embodiment, implementing power savings is provided by computer system 700 in response to processor 704 executing one or more sequences of one or more instructions contained in main memory 706. Such instructions may be read into main memory 706 from another computer-readable medium, such as storage device 710. Execution of the sequence of instructions contained in main memory 706 causes processor 704 to perform the process steps described herein. One or more processors in a multi-processing arrangement may also be employed to execute the sequences of instructions contained in main memory 706. In alternative embodiments, hardwired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 704 for execution. Such a medium may take many forms, including but not limited to non-volatile media, and volatile media. Non-volatile media include for example optical or magnetic disks, such as storage device 710. Volatile media include dynamic memory such as main memory 706. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 704 for execution. For example, the instructions may initially be borne on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706 from which processor 704 retrieves and executes the instructions. The instructions received by main memory 706 may optionally be stored on storage device 710 either before or after execution by processor 704.

Computer system 700 is coupled to wireless transceiver 102 via bus 702. Wireless transceiver 718 provides a two-way data communication coupling computer system 700 to network 700 via wireless link 720. In accordance with example embodiments described herein, processor 704 may operate wireless transceiver in a power save state while not in communication with network 722, and may periodically operate wireless transceiver 102 in a power save state in which wireless transceiver 102 may receive signals, such as a wakeup frame, from network 722. Processor 704, upon receiving a wakeup frame via wireless transceiver 102, switches wireless transceiver 102 to a normal operating mode.

Figure 8:
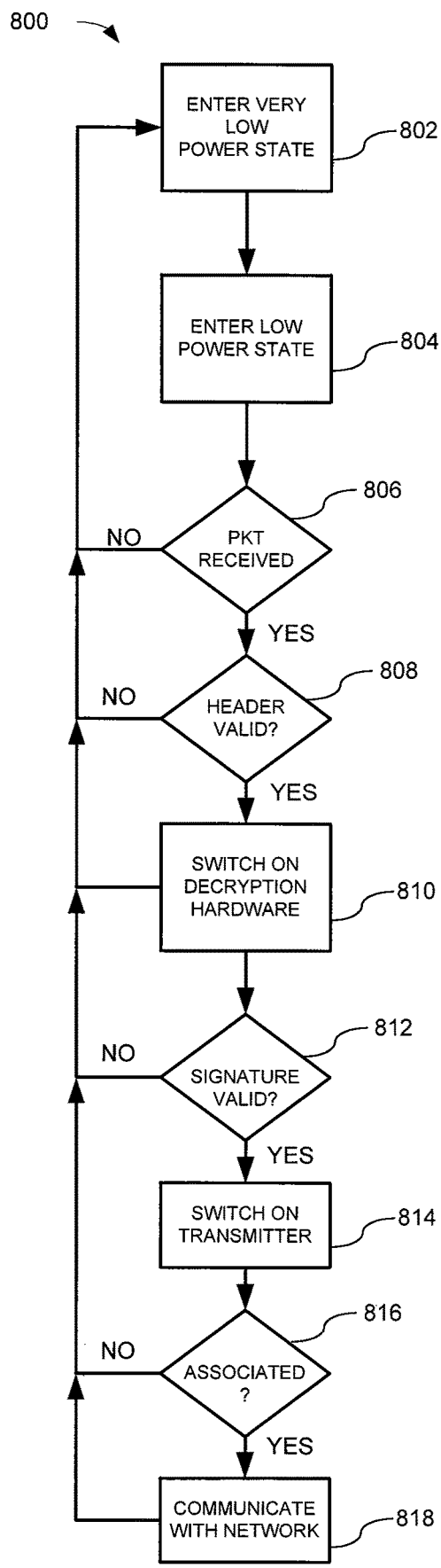
FIG. 8 is an example of a methodology that employs a wakeup frame for informing a wireless device that a certain type of network is available.

In view of the foregoing structural and functional features described above, a methodology 800 in accordance with an example embodiment will be better appreciated with reference to FIG. 8. While, for purposes of simplicity of explanation, methodology 800 of FIG. 8 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect of an example embodiment. Methodology 800 is suitably adapted to be implemented in hardware, software, or a combination thereof. For example methodology 800 may be implemented by controller 104 (FIG. 1, FIG. 4, FIG. 5), processor 604 (FIG. 6), and/or encoded in a computer readable medium which performs the functionality upon execution by a processor.

In an example embodiment, methodology 800 is performed by a multi-mode wireless device. For example, methodology 800 may be performed by a wireless device comprising a first transceiver, such as a cellular transceiver and a second transceiver, such as a Wi-Fi transceiver. In an example embodiment, methodology 800 is performed by the second (e.g., Wi-Fi) transceiver while the first transceiver (e.g., a cellular transceiver) operates in a normal operating mode.

At 802, the wireless transceiver is put into a very low power state. In the very low power state the wireless transceiver is unable to send and receive signals.

At 804, the wireless transceiver is periodically switched into a low power state. In the low power state, the wireless transceiver can receive a frame; however, other portions of the wireless transceiver or circuits associated with the wireless transceiver may be de-energized. For example, the wireless transceiver may or may not be able to decrypt the frame. In this example the low power state may also be referred to as the first power state and the very low power state as the second power state. The wireless transceiver may be switched into the low power save state for a predetermined interval. For example, referring to FIG. 2 with continued reference to FIG. 8, the predetermined interval can be related to the expected transmit interval of wakeup frames, which in the example of FIG. 2 the listen interval 206 is twice as long as the transmit (Tx) interval 204.

At 806, if a packet was not received while the wireless transceiver was in the low power state (NO); the wireless transceiver is returned to the very low power state as indicated by 802. Alternatively, the wireless transceiver may remain in the low power state until the end of the listening interval if the listening interval hasn't expired.

If at 806, a determination is made that a frame (or plurality of frames) was received while in the low power state (YES), at 808 a determination is made whether the frame is a wakeup frame. In a multi-transceiver device embodiment, the determination may also consider whether the frame was a frame from a network affiliated with the network communicating with the other transceiver (for example is the Wi-Fi network affiliated with the cellular network). In an example embodiment, the header (or headers) is examined to determine if the frame was a wakeup frame (or a predefined sequence of wakeup frames). The headers are examined to determine whether the frames have a predefined multicast address. If the frame was not a wakeup frame (NO), the wireless transceiver returns to the very low power state at 802. Alternatively, the wireless transceiver may remain in the low power state until the end of the listening interval if the listening interval hasn't expired.

If at 808, the frame is determined to be a wakeup frame (YES), at 810 the decryption hardware is switched on. In an example embodiment, the encryption hardware may be switched on when the wireless transceiver enters the low power state. If, however, the network does not employ signatures, the decryption hardware is not turned on.

At 812, the decryption hardware attempts to validate the signature (or if a sequence of frames were employed the signature of each frame in the sequence). If validation fails (NO), the wireless transceiver returns to a lower power state, such as the very low power state at 802. Alternatively, the wireless transceiver may remain in the low power state until the end of the listening interval if the listening interval hasn't expired.

If at 812, the signature is validated (YES), at 814 the transmitter (or transmitter circuit) is switched on. Once the transmitter is operable, the transmitter attempts to associate with the network. In an example embodiment, the wakeup frame (or at least one of a sequence of wakeup frames are employed) contains a regulatory class, BSSID, and/or channel for the AP sending the wakeup frame(s) and/or neighboring APs. The wireless transceiver switches to a channel designated in the frame to associate with the network.

At 816, if the wireless transceiver does not associate with a network within a predetermined time (NO), the wireless transceiver is returned to the very low power state at 802. Alternatively, the wireless transceiver may remain in the low power state until the end of the listening interval if the listening interval hasn't expired.

If, at 816, the wireless transceiver associates with the network (YES), the wireless transceiver communicates with network as illustrated by 818. If communications are lost with the wireless network, the wireless transceiver returns to the very low power state as indicated by 802.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally and equitably entitled.

The invention claimed is:

1. An apparatus, comprising:
a wireless transceiver; and
a controller coupled to the wireless transceiver, wherein the controller operates the wireless transceiver to:
periodically transmit a beacon frame at a beacon frame rate; and
periodically transmit each wakeup frame of a predefined sequence of wakeup frames at a data rate that is greater than the beacon frame rate,
wherein the controller is configured to include predefined information in the predefined sequence of wakeup frames that is usable by a client device to validate the predefined sequence of wakeup frames,
wherein the predefined information comprises, for each wakeup frame of the predefined sequence, a respective destination address field storing a multicast address distinct from the one or more other wakeup frames of the predefined sequence, and
wherein validating the predefined sequence of wakeup frames configures the client device to energize hardware of the client device.

2. An apparatus according to claim 1, wherein the wireless transceiver sends and receives data on a first channel; and
wherein the predefined sequence of wakeup frames is sent on a second channel.

3. The apparatus according to claim 1, wherein the predefined information included in the predefined sequence of wakeup frames further comprises a predefined signature.

4. The apparatus according to claim 3, wherein the apparatus is implemented as an Access Point (AP), and wherein the predefined signature comprises a signature of a Basic Service Set Identifier (BSSID) of the AP.

5. The apparatus according to claim 3, wherein validating the predefined sequence of wakeup frames configures the client device to:
energize a decryption circuit;
attempt to validate the predefined signature using the decryption circuit;
energize a transmitter circuit responsive to validating the predefined signature; and
attempt to associate with a network via the transmitter circuit.

6. The apparatus according to claim 5, wherein the client device attempts to associate with the network using a channel specified by at least one wakeup frame of the predefined sequence of wakeup frames.

7. The apparatus according to claim 6, wherein the at least one wakeup frame comprises at least one of: Basic Service Set Identifier (BSSID) data, regulatory class data, and operating channel data associated with the wireless transceiver.

8. The apparatus according to claim 6, wherein the at least one wakeup frame comprises at least one of: Basic Service Set Identifier (BSSID) data, regulatory class data, and operating channel data associated with one or more neighboring access points.

9. The apparatus according to claim 1, wherein the wireless transceiver transmits each wakeup frame of the predefined sequence of wakeup frames according to a transmit interval such that the predefined sequence of wakeup frames is transmitted entirely within a listen interval associated with the client device.

10. The apparatus according to claim 1, wherein the predefined information included in the predefined sequence of wakeup frames further comprises at least one of: Basic Service Set Identifier (BSSID) data, regulatory class data, and operating channel data associated with the wireless transceiver.

11. The apparatus according to claim 1, wherein the wireless transceiver is configured to transmit the predefined sequence of wakeup frames on a dedicated wakeup channel for the configuration domain.

12. The apparatus according to claim 1, wherein the predefined sequence of wakeup frames further comprises data associated with one or more neighboring access points, the data comprising at least one of: Basic Service Set Identifier (BSSID) data, regulatory class data, and operating channel data for the one or more neighboring access points.

13. The apparatus according to claim 1,
wherein the apparatus is implemented as an Access Point (AP),
wherein the beacon frame and the predefined wakeup frame are transmitted to a client device,
wherein each wakeup frame of the predefined sequence of wakeup frames is unencrypted, and
wherein the distinct multicast addresses are selected to reduce a probability that the client device responds to devices other than the AP.

14. The apparatus according to claim 13, wherein the controller is further configured to, over time, dynamically re-select the distinct multicast addresses for the predefined sequence of wakeup frames.

15. The apparatus according to claim 1, wherein energizing the hardware of the client device comprises energizing a decryption circuit of the client device.

16. The apparatus according to claim 1,
wherein the client device is a multi-mode device having a cellular transceiver and a Wi-Fi transceiver, and
wherein the wireless transceiver is the Wi-Fi transceiver.

17. A method of communicating using an access point (AP), the method comprising:
periodically transmitting, using a wireless transceiver of the AP, a beacon frame at a beacon frame rate;
generating, using a controller of the AP, a predefined sequence of wakeup frames comprising predefined information that is usable by a client device to validate the predefined sequence of wakeup frames, wherein validating the predefined wakeup frame configures the client device to energize hardware of the client device, wherein the predefined information comprises, for each wakeup frame of the predefined sequence, a respective destination address field storing a multicast address distinct from the one or more other wakeup frames of the predefined sequence;

selecting a transmit interval that is less than a listen interval associated with the client device; and transmitting, using the wireless transceiver, the sequence of predefined wakeup frames within the transmit interval, wherein each wakeup frame of the predefined sequence of wakeup frames is transmitted at a data rate that is greater than the beacon frame rate.

18. The method of claim 17, wherein the predefined information of the predefined sequence of wakeup frames further comprises at least one of: Basic Service Set Identifier (BSSID) data, regulatory class data, and operating channel data associated with the AP or associated with one or more neighboring APs.

19. A non-transitory tangible computer-readable medium comprising code which, when executed by one or more processors, performs an operation for communicating using a wireless transceiver, the operation comprising:

periodically transmitting, using a wireless transceiver, a beacon frame at a beacon frame rate;

generating a predefined sequence of wakeup frames comprising predefined information that is usable by a client device to validate the predefined sequence of wakeup frames, wherein validating the predefined sequence of wakeup frames configures the client device to energize hardware of the client device, wherein the predefined information comprises, for each wakeup frame of the predefined sequence, a respective destination address field storing a multicast address distinct from the one or more other wakeup frames of the predefined sequence;

selecting a transmit interval that is less than a listen interval associated with the client device, wherein the transmit interval corresponds to transmitting each wakeup frame of the sequence of predefined wakeup frames at a data rate that is greater than the beacon frame rate; and communicating the predefined sequence of wakeup frames to the wireless transceiver, wherein the predefined sequence of wakeup frames is transmitted by the wireless transceiver within the selected transmit interval.

20. The computer-readable medium of claim 19, wherein the transmit interval is selected such that the sequence can be transmitted by the wireless transceiver entirely within the listen interval.

* * * * *

UNITED STATES PATENT AND TRADEMARK OFFICE
CERTIFICATE OF CORRECTION

PATENT NO. : 10,750,443 B2  
APPLICATION NO. : 15/494200  
DATED : August 18, 2020  
INVENTOR(S) : Allan Thomson et al.

Page 1 of 1

It is certified that error appears in the above-identified patent and that said Letters Patent is hereby corrected as shown below:

In the Specification

In Column 5, Line 22, delete "If during" and insert -- During the --.

In Column 5, Line 22, before "a sequence" insert -- 302, --.

In Column 5, Line 23, delete "received," and insert -- received. --.

Signed and Sealed this  
Twenty-seventh Day of December, 2022

Katherine Kelly Vidal  
*Director of the United States Patent and Trademark Office*